US011904930B2

(12) United States Patent
Deeg et al.

(10) Patent No.: US 11,904,930 B2
(45) Date of Patent: Feb. 20, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Benjamin Deeg, Dornbirn (AT); Eric Caron, Feldkirch (AT)

(73) Assignees: thyssenkrupp Presta AG, Eschon (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/007,857

(22) PCT Filed: May 27, 2021

(86) PCT No.: PCT/EP2021/064154
§ 371 (c)(1),
(2) Date: Dec. 2, 2022

(87) PCT Pub. No.: WO2021/244931
PCT Pub. Date: Dec. 9, 2021

(65) Prior Publication Data
US 2023/0271642 A1    Aug. 31, 2023

(30) Foreign Application Priority Data
Jun. 3, 2020    (DE) ............ 10 2020 206 955.7

(51) Int. Cl.
*B62D 1/181*    (2006.01)
*B62D 1/183*    (2006.01)
(Continued)

(52) U.S. Cl.
CPC ............ *B62D 1/181* (2013.01); *B62D 1/183* (2013.01); *B62D 1/185* (2013.01); *B62D 1/19* (2013.01)

(58) Field of Classification Search
CPC ........ B62D 1/181; B62D 1/183; B62D 1/185; B62D 1/19
See application file for complete search history.

(56) References Cited

U.S. PATENT DOCUMENTS

2011/0239808 A1    10/2011    Schnitzer
2017/0043803 A1*    2/2017    Yamamoto ............ B62D 1/184
(Continued)

FOREIGN PATENT DOCUMENTS

CN    108602523 A    *    9/2018    ............ B62D 1/181
CN    115465352 A    *    12/2022    ............ B62D 1/185
(Continued)

OTHER PUBLICATIONS

English Translation of International Search Report issued in PCT/EP2021/064154, dated Sep. 3, 2021.

*Primary Examiner* — Drew J Brown
(74) *Attorney, Agent, or Firm* — thyssenkrupp North America, LLC

(57) ABSTRACT

A steering column for a motor vehicle may include a casing unit in which a steering spindle is mounted so as to be rotatable about a longitudinal axis extending in a length direction. The casing unit may have at least two casings that are adjustably guided relative to one another through a range of adjustment travel in the length direction. Part of the adjustment travel may correspond to a transitional portion, and part of the adjustment travel may correspond to a functional portion. The casings may be guided with a greater play in the transitional portion than in the functional portion. One casing may have a guide track and another casing may have a guide element that engages in the guide track and is guided in the length direction and has a guide play in the guide track that is greater in the transitional portion than in the functional portion.

15 Claims, 4 Drawing Sheets

(51) Int. Cl.
*B62D 1/185* (2006.01)
*B62D 1/19* (2006.01)

(56) References Cited

U.S. PATENT DOCUMENTS

| | | |
|---|---|---|
| 2018/0001922 A1 | 1/2018 | Gstohl et al. |
| 2019/0111960 A1 | 4/2019 | Freudenstein et al. |
| 2019/0322307 A1 | 10/2019 | Kwon et al. |
| 2021/0197882 A1 | 7/2021 | Bayer et al. |
| 2023/0331283 A1 * | 10/2023 | Caverly ................. B62D 1/183 |

FOREIGN PATENT DOCUMENTS

| | | | | |
|---|---|---|---|---|
| DE | 10 2015 000 027 A1 | | 7/2016 | |
| DE | 102018204735 A1 * | | 10/2018 | ............. B62D 1/181 |
| DE | 102018211041 A1 | | 1/2020 | |
| KR | 20230046919 A * | | 4/2023 | |
| WO | WO-2014161617 A1 * | | 10/2014 | ............... B62D 1/16 |
| WO | WO-2018127590 A1 * | | 7/2018 | ............. B62D 1/181 |
| WO | WO-2019101781 A1 * | | 5/2019 | ............. B62D 1/181 |
| WO | WO-2021180609 A1 * | | 9/2021 | |
| WO | WO-2021224200 A1 * | | 11/2021 | ............. B62D 1/181 |
| WO | WO-2023072653 A1 * | | 5/2023 | ............. B62D 1/181 |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2021/064154, filed May 27, 2021, which claims priority to German Patent Application No. DE 10 2020 206 955.7, filed Jun. 3, 2020, the entire contents of which are incorporated herein by reference.

FIELD

The present disclosure generally relates to steering columns, including steering columns for motor vehicles.

BACKGROUND

A steering column for a motor vehicle comprises a steering shaft with a steering spindle on which, at the rear end in the direction of travel and facing the driver, a steering wheel is arranged for input of a steering command by the driver. The steering spindle is rotatably mounted in a casing unit, together with which it forms an actuator unit. The casing unit is held by a carrier unit attached to the vehicle body. Adjustable steering columns allow adjustment of the steering wheel position relative to the vehicle body by adjustment of the casing unit relative to the carrier unit.

It is known to make steering columns adjustable in the length direction, i.e. in the axial direction of the steering spindle or in the direction of the longitudinal axis, in order in manual driving mode to adapt the operating position of the steering wheel to the driver's position for comfortable manual steering intervention. For autonomously driving vehicles, in autonomous driving mode when there is no manual steering input, the steering column may be retracted further out of the operating position by further adjustment in the length direction, in order to bring the steering wheel into a stowage position outside the operating position and clear the vehicle interior for other use.

For length adjustment and stowage, DE 10 2018 211 041 A1 describes a casing unit with a telescopic arrangement of casings. These casings comprise an outer casing tube supported on the body at the front in the direction of travel, also called the lower casing, in which an upper casing formed as an inner casing tube engages so as to be telescopically adjustable in the length direction. For length adjustment, a motorized adjustment drive is provided which is configured as a spindle drive and acts on the casing tubes in the length direction. By means of the adjustment drive, a maximum adjustment may be made from the stowage position, in which the casings are retracted into one another as far as possible, up to a driver's-side end position, in which the casings are maximally extended from one another up to an end stop. The maximum possible adjustment range between the stowage position and the end position defines the adjustment travel of the steering column.

In manual driving mode, the steering column is set such that the steering wheel sits in an individual operating position within an operating range, which designates an adjustment range of ergonomically suitable operating positions for input of steering commands. The operating range is provided by a defined functional portion of the adjustment and is known as the comfort range. A further functional portion of the adjustment may be situated in the region of the stowage position. The part region of the adjustment travel at the transition between the operating range and the stowage position forms a transitional portion of the adjustment.

In order to guarantee maximum stiffness and high inherent frequency of the steering column, at least in the operating range and in some cases also in the stowage range, DE 10 2018 211 041 A1 discloses guiding the casings as casing tubes inside one another with precise fit and low-play guidance in this functional portion. The low-play guidance leads to relatively high frictional forces during adjustment which must be overcome by the adjustment drive. To adjust the steering wheel position, only a low adjustment speed is necessary, so an advantageously compact and lightweight adjustment drive with high drive power is sufficient. In order to also allow a relatively high adjustment speed on stowage with this low drive power, DE 10 2018 211 041 A1 proposes increasing the guide play between the casing tubes in the transitional portion of the adjustment, thereby reducing the friction. Since the transitional portion is used only at the transition outside the functional portion, a lower stiffness is acceptable there. However, practical implementation requires complex machining of the casings in order to form the functional and transitional portions with different dimensions and fits of the casing tubes, and an individual design of the casing tubes for use in steering columns with operating and transitional regions of different lengths.

Thus a need exists for an adapted guidance at lower costs and with greater flexibility.

DETAILED DESCRIPTION

Figure 1:
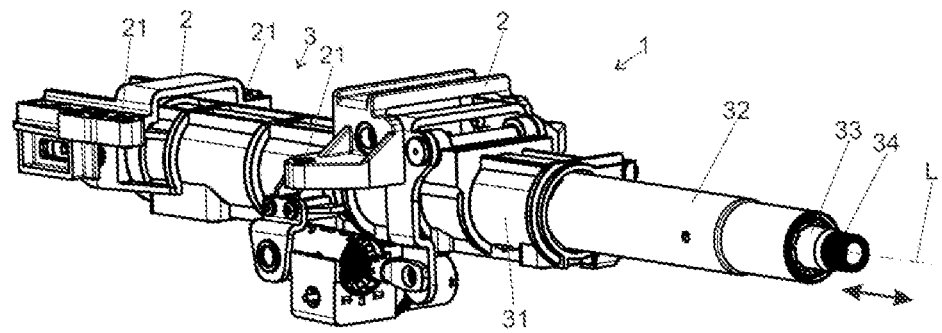
FIG. 1 is a schematic perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles. In some examples, such a steering column may comprise a casing unit in which a steering spindle is mounted so as to be rotatable about a longitudinal axis extending in a length direction and which has at least two casings that are adjustably guided relative to one another about an adjustment travel in the length direction. In a part portion of the adjustment travel configured as a transitional portion, the casings are guided with a greater play than in a part portion of the adjustment travel configured as a functional portion.

In a steering column for a motor vehicle, comprising a casing unit in which a steering spindle is mounted so as to be rotatable about a longitudinal axis extending in the length direction and which has at least two casings which are adjustably guided relative to one another about an adjustment travel in the length direction, wherein in a part portion of the adjustment travel configured as a transitional portion, the casings are guided with a greater play than in a part portion of the adjustment travel configured as a functional portion, according to the invention it is proposed that one casing has a guide track and another casing has a guide element which engages in the guide track and is guided in the length direction and has a guide play in the guide track which is greater in a transitional portion than in a functional portion.

According to the invention, guidance is not provided by the casing tubes themselves, as in the prior art, but by a guide device which is functionally independent thereof and provided on the casings. In concrete terms, for this a guide track which is elongate in the length direction may be fixed to one of the casings, and a guide element corresponding to said guide track and cooperating therewith in functional engagement may be arranged on another casing. The interaction of guide track and guide element may provide a forced guidance in the length direction, which can be optimized with respect to specific guide characteristics over the adjustment travel independently of the other design of the casings. Thus for example the guide play existing between guide track and guide element may be increased in portions in order to create a loose form fit with play in a transitional portion, which has a low friction with respect to a relative adjustment of the casings. Also, purely by the matching of guide track and guide element with low play and precise fit, a stiff connection of the casings in a functional portion may be created. The guide track and guide element can be produced and adapted, in order for example to provide functional and transitional portions of different lengths, at lower cost than would be necessary by machining the casing tubes in the prior art. Thus the production costs may be reduced and the flexibility of the application increased.

The casings may comprise at least one upper casing and one lower casing. The upper casing is the rear casing in the direction of travel on the driver's side, and the lower casing is the front casing in the direction of travel on the vehicle or body side. At least one intermediate casing, which is preferably telescopically adjustable in the length direction, may be inserted in the casing unit between the two casings in order to achieve a multiple extension with large adjustment range. Guide tracks and guide elements according to the invention may be arranged on the casings and intermediate casings.

In an advantageous refinement, the guide track and guide element are configured such that adjustment is possible without damage in the transitional portion and in the functional portion; in other words, the guide track and guide element are undamaged after adjustment relative to one another, i.e. substantially there is no permanent deformation which perceptibly influences the guidance function. Wear resulting from sliding contact after a plurality of adjustment operations is here not considered as damage. In other words, between the guide element and guide track, there is no energy absorption by plastic deformation in order to dissipate an accident-induced energy input by deformation work.

In an advantageous refinement, the guide track and guide element are not in contact with one another in the transitional portion, or do not touch one another. For example, a sliding guidance with play may be formed.

The casings may comprise telescopic casing tubes. A telescopic arrangement of the casing unit comprises at least one outer casing tube and one inner casing tube, which is telescopically adjustable therein in the length direction, and one or more intermediate casing tubes inserted in between in a multiple telescopic arrangement. The casing tubes may have a circular, oval or polygonal cross-section. A respective guide track and guide element according to the invention may be arranged correspondingly with one another on the inside of an outer casing and on the outside of an inner casing which is inserted therein. One advantage is that casing tubes of different cross-section and different dimensions may be designed with low structural and component complexity using a guide device according to the invention.

It is advantageous that the guide track and guide element constitute a form-fit connection active in the circumferential direction. A form-fit connection in the circumferential direction may be created for example by an engagement between guide element and guide track in the radial direction relative to the longitudinal axis. In this way, twist prevention between the casings may be achieved.

It is possible that the guide play between the guide track and the guide element exists in the circumferential direction. Such a guide play may be created at advantageously low cost for example with a form-fit connection active in the circumferential direction. To form a transitional region, a loose form-fit connection with relatively large guide play may be provided by an air gap between the guide track and guide element, while in a functional region a low play is provided between guide faces of the guide track and guide element oriented against one another in the circumferential direction, for example also by a low-play or play-free clamping of the guide surfaces by means of a pretension force. The radial play between the casings, for example between the telescopic casing tubes, may be retained unchanged, so that the production costs may be lower than in the prior art for the machining, necessary for the different radial play, of the casing tubes in order to obtain functional and transitional portions.

An advantageous embodiment of the invention may provide that the guide track has an elongate guide groove in which a guide protrusion of the guide element engages and which in portions has a smaller groove width. The guide groove extends in the length direction and is open radially with respect to the longitudinal axis. The corresponding guide protrusion may for example have a peg-like or web-like form and protrude radially into the guide groove. In the length direction and preferably also in the circumferential direction, the guide groove is fixed to the outside of an inner casing or to the inside of an outer casing, and the corresponding guide protrusion is fixed accordingly radially opposite on the respective other casing. The reduced groove width of the guide groove in a part portion reduces the lateral guide play, i.e. the guide play existing in the circumferential direction between the groove flanks of the guide groove and the guide protrusion, and provides a functional portion.

Outside such a functional portion, a transitional portion with greater guide play may be provided simply by a greater groove width, in that the guide protrusion has a lateral air gap from the groove flanks, i.e. in the circumferential direction, so that a loose form-fit is created. Here it is advantageous that a guide groove with different groove width can be produced at low cost. A precise longitudinal guidance which is reliable in operation can be guaranteed.

The guide groove may be closed at the end in order to provide a length stop for the guide protrusion, preferably at both ends or also only at one end.

It may be provided that the guide track has an elongate guide protrusion which engages in a guide recess of the guide element and which in portions has a greater web width. The guide protrusion extends in the length direction and protrudes radially relative to the longitudinal axis, and may for example be formed as a web or rail. The corresponding guide recess may for example be groove-shaped and surround the guide protrusion, i.e. the guide protrusion protrudes radially into the guide recess. In the length direction and preferably also the circumferential direction, the guide protrusion is fixed to the outside of an inner casing or to the inside of an outer casing, and the corresponding guide recess is fixed accordingly, radially opposite, to the respective other casing. A reduced width of the guide protrusion in a part portion may reduce the lateral guide play, i.e. the play existing in the circumferential direction between the flanks of the guide groove and the guide protrusion, and provide a functional portion. Outside such a functional portion, simply by a smaller width, a transitional portion with greater guide play may be provided in which the guide protrusion has a lateral air gap, i.e. in the circumferential direction, from the flanks of the guide recess so as to create a loose form fit. Here it is advantageous that a guide protrusion with different width can be produced at low cost. A precise longitudinal guidance which is reliable in operation may be guaranteed.

It is possible that a small guide play is formed in one end portion or in both end portions of the guide track. The length of the guide track is dimensioned such that the guide element can be moved therein along the adjustment travel of the casing unit. The smaller guide play in portions may form a functional portion in an end region of the guide track in which the guide element is situated when the operating range of the steering column is set, i.e. the casings are extended from one another. It may also be provided that in the other end portion, which corresponds to the retracted stowage position of the casings, another functional portion is implemented to allow a safe and vibration-free fixing in the stowage position.

It may also be preferred that the guide track has a guide track body and/or the guide element has a guide element body which is arranged or formed on a casing. The guide track body is elongate in the length direction and may for example comprise a profile body with a guide groove and/or a guide protrusion. Correspondingly, the guide element body may be formed with a guide protrusion or a guide recess.

In an advantageous embodiment, the guide track body and/or the guide element body are formed separately and connected to a casing. In this way, the length of functional and transitional portions according to the invention on the guide track body and/or the guide element body may be predefined initially independently of the casing tube arrangement. Then fixing to the casings may take place, whereby the casing unit may be equipped with a predefined guide characteristic. One advantage is that different guide characteristics can be achieved purely by corresponding adaptation of the guide, with otherwise unchanged casings.

In this way, the cost of construction, production and storage may be reduced, and the flexibility of the application increased.

The connection between the guide track body and/or guide element body and a casing tube may take place by means of fixing elements or other preferred form-fit and/or substancebonded connecting methods.

It is also conceivable and possible to form a guide track body and/or a guide element body integrally with a casing, for example as one piece, or provide a combination of separate and integrated bodies for the guide track and guide element.

It may be furthermore advantageous if the guide track body and/or the guide element body are made from a material different from that of a casing. In this way, for example, an optimized sliding guidance may be achieved between the guide track and guide element. While the casings are usually made of alloys of steel, aluminum or magnesium, the guide tracks or elements may comprise a nonferrous metal or preferably a plastic. The good sliding and guidance properties of such a material pairing may provide a low-play, stiff yet easily adjustable guidance.

For adjustment, a motorized adjustment drive may be provided which is coupled to the casings so as to adjust the casings relative to one another at least in a length direction. The adjustment drive may for example comprise a spindle drive with a spindle nut arranged on the threaded spindle, and an electric drive motor via which the threaded spindle and spindle nut can be driven in rotation relative to one another. Such adjustment drives are known in principle in the prior art and considered reliable and robust. The spindle nut is arranged immovably in the length direction on the one casing, and the threaded spindle on the other casing tube which is telescopic thereto. Via a suitable gear mechanism, for example a worm gear or belt gear, the drive motor drives the spindle nut or threaded spindle in rotation, whereby the threaded spindle or spindle nut, which is stationary with respect to rotation, is moved translationally in the direction of the spindle axis, and the casings are retracted or extended in the length direction depending on the relative direction of rotation.

Advantageous refinements may provide that an energy absorption device is arranged between the guide track or the guide element and a casing. Thus energy absorption does not take place between the guide track and guide element, but according to the force flow and/or spatially between the guide track or guide element and one of the casings. For example, it may be provided that energy absorption elements known in themselves, e.g. expansion, bending, crushing and/or tear elements, are used which deform plastically with energy absorption on a relative movement of the casings in the length direction occurring only in the event of a crash. In this way in the event of a crash, a body impacting the steering wheel may be decelerated in defined fashion in order to reduce the risk of injury.

Figure 2:
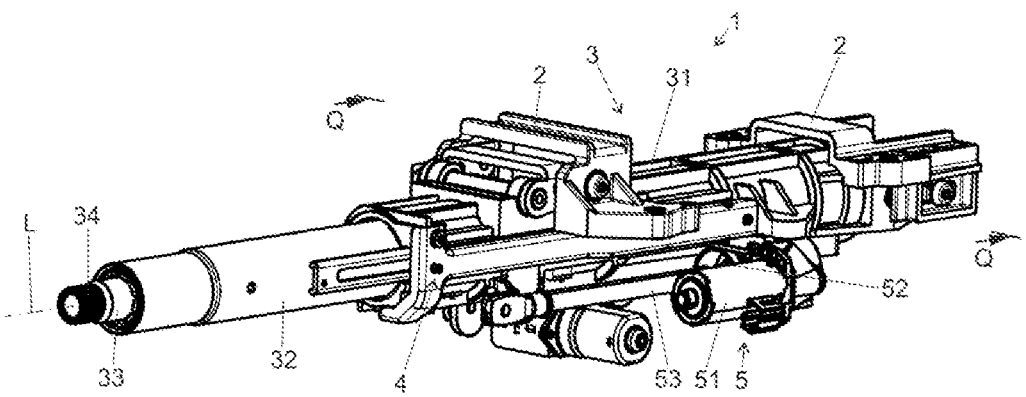
FIG. 2 is another schematic perspective view of a steering column.
Figure 3:
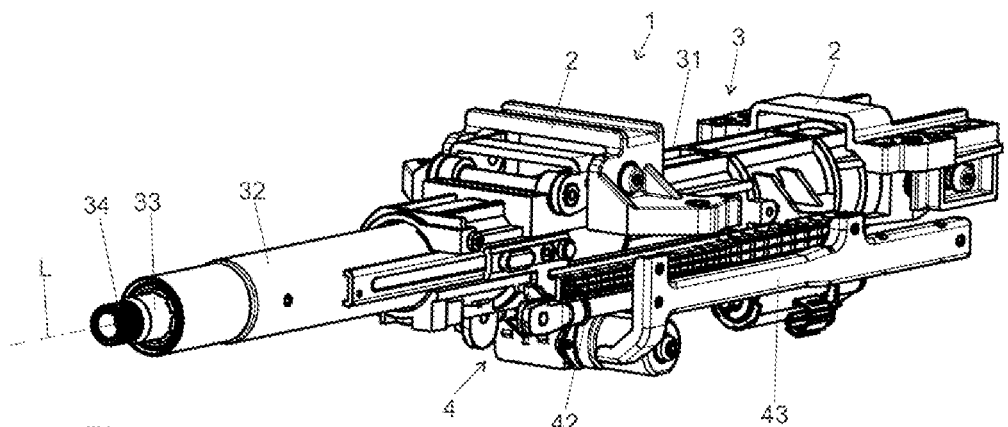
FIG. 3 is a partially exploded view of the steering column from FIG. 2.

FIGS. 1 and 2 shows a steering column 1 according to the invention in various perspective views, diagonally from the left rear (FIG. 1) and diagonally from the right rear (FIG. 2) relative to the direction of travel, and FIG. 3 shows a partially expanded illustration, exploded transversely to the direction of travel.

Figure 4:
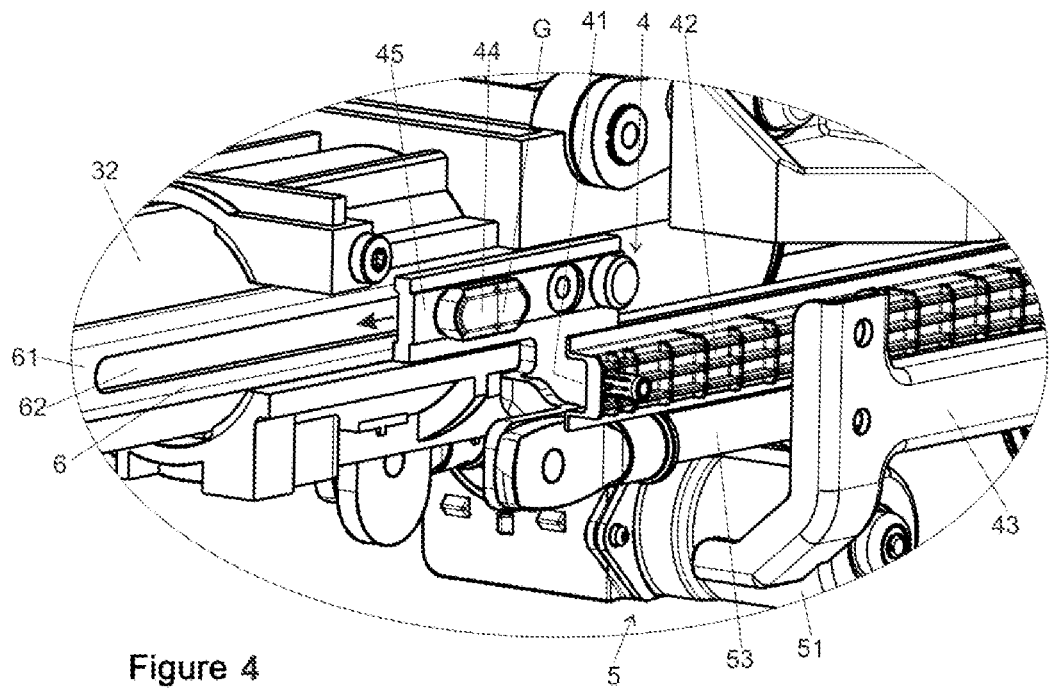
FIG. 4 is an enlarged extracted view from FIG. 3.
Figure 5:
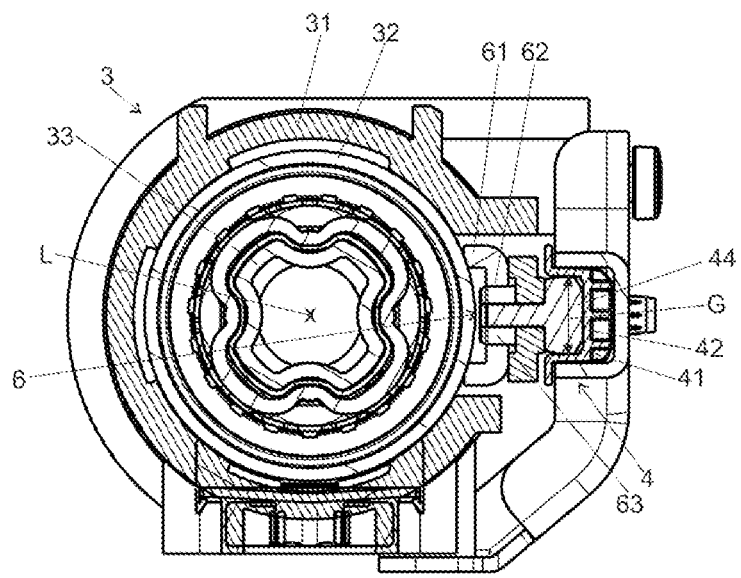
FIG. 5 is a cross-sectional view taken across line Q-Q through the steering column from FIGS. 2 and 6.

FIG. 3 shows a partially schematic cutaway steering column 1 in a view from the left (the side visible in FIGS. 2 and 3) and FIG. 4 shows an enlarged view thereof. FIG. 5 shows a cross-sectional view Q-Q according to FIG. 6 or 2.

The steering column 1 comprises a two-piece carrier unit 2 with fixing means, namely fixing openings 21 for attachment to a vehicle body (not shown).

A casing unit 3 is held by the carrier unit 2 and, on the body side at the front in the direction of travel, comprises an outer casing 31, also described as the lower casing, and an inner casing 32, also described as the upper casing. A steering spindle 33 is mounted in the inner casing 32 so as to be rotatable about a longitudinal axis L extending in the length direction, and at its rear end portion has a connecting portion 34 for attachment of a steering wheel (not shown).

The inner casing 32 is configured as a casing tube with a base body with round tube cross-section, and for length adjustment is received in the outer casing 31 and is telescopically adjustable in the length direction as indicated by the double arrow. In a set position, an operating or control position as shown in the figures, the casing is extended relatively far out of the outer casing, i.e. to the right in FIG. 1 and to the left in FIGS. 2 to 4, and 6 to 8.

For length adjustment, a motorized adjustment drive 5 is provided, configured as a spindle drive with a spindle nut 52, which is supported in the length direction on the outer casing 31 and is able to be driven rotationally by an electric motor 51, and engaging therein a threaded spindle 53 which extends in the length direction and is fixed to the inner casing 32 rotationally and in the length direction.

A guide device 4 according to the invention comprises a guide track in which a guide groove 41 is formed which is elongate in the length direction. This guide groove 41 has a groove cross-section open radially to the longitudinal axis, also called a guide cross-section, and is formed in a guide track body 42. which is fixed to the outer casing 31 in the length direction and in the circumferential direction relative to the longitudinal axis L by means of a carrier element 43.

A guide element in the form of a guide protrusion 44 is fixed in the length and circumferential directions and protrudes radially relative to the longitudinal axis L. The guide protrusion 44 has the form of a peg which is elongate in the length direction and has a width G measured transversely to the length direction, i.e. in the circumferential direction. The guide protrusion 44 protrudes radially outward from a guide element body 45 and engages from the inside in the guide groove 41 such that it is force-guided movably in the length direction, i.e. is supported by form fit in the circumferential direction.

The guide track body 42 may be formed from a plastic at least in the region of the guide groove 41. Alternatively or additionally, the guide protrusion 44 may be made of a plastic at least in the region of contact with the guide groove 41. Alternatively, a metal may be used, or the guide track body 42 may be formed from a metal, for example as a casting or extrusion.

In normal operating state, the guide element body 45 is fixed on the outside of the inner casing 32 in the length and circumferential direction via an energy absorption device 6. The energy absorption device 6 has a profile rail 61 which is fixedly arranged on the inner casing 32 and has a slot 62 which is elongate in the length direction. A bolt-like expansion element 63 is pressed into said slot 62 and protrudes on the inside of the guide element body 45 facing away from the guide protrusion 44. Because the expansion element 63 has an oversize relative to the width of the slot 62 and is pressed into the slot 62 with local deformation, the guide element body 45 is fixed in the length direction to the inner casing 32 via the profile rail. The threaded spindle 53 of the adjustment drive 5 engages on the inner casing 32 via this guide element body 45 and the absorption device 6 for length adjustment. Only in the case of a crash, when the inner casing 32 is pushed into the outer casing 31 with an extremely high force, is the expansion element 63 pushed through the slot 62 in the length direction under plastic expansion, as indicated in FIG. 4 with the arrow, wherein kinetic energy is absorbed.

In normal adjustment mode, the guide protrusion 44 is guided slidingly in the guide groove 41, as is clearly evident in the cross-section Q-Q of FIG. 5.

Figure 6:
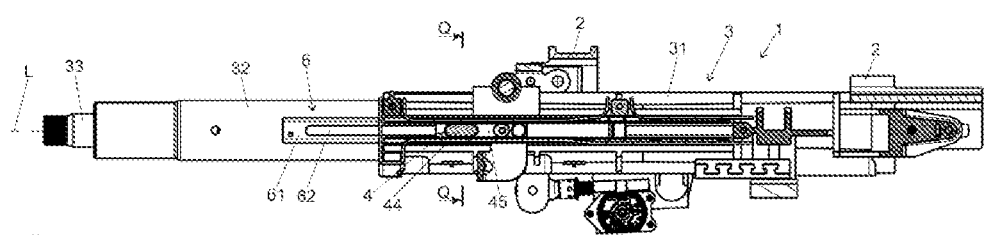
FIG. 6 is a partial cutaway side view of the steering column from FIGS. 1 and 2.
Figure 7:
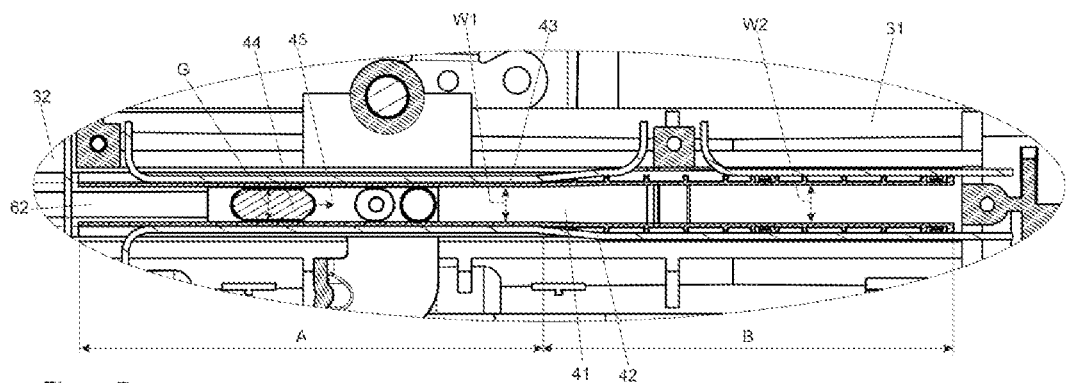
FIG. 7 is an enlarged, detail view of a guide device from FIG. 6.

In FIG. 6 and in the enlarged illustration of FIG. 7, for greater clarity, the carrier element 43 has been omitted and the carrier element body 42 schematically cut open longitudinally, i.e. illustrated radially opened from the outside, to give a view of the guide groove 41 which would otherwise be closed towards the outside.

According to the invention, the guide groove 41 has a functional portion A which extends over a part portion of its length corresponding to the operating range illustrated, in which the casings 31 and 32 can be adjusted in the length direction relative to one another in order to set the steering wheel position. In the functional portion A, the guide groove 41 has a groove width W1 measured in the circumferential direction transversely to the longitudinal axis L. This groove width W1 is matched with a slight guidance play to the width G of the guide protrusion 44 so that the guide protrusion 44 is guided slidingly in the length direction and the guidance produces a high stiffness of the casing unit 3. The amount of guide play results from the difference W1–G. In the insertion direction indicated by the arrow on the guide protrusion 44, and in which the inner casing 32 is moved into the outer casing 31 on retraction, a transitional portion B adjoins the functional portion A. The total possible adjustment travel substantially corresponds to the sum of portions A+B. The groove width W2 in this transitional portion B according to the invention is greater than the groove width W1. Therefore a greater guide play exists between the guide protrusion 44 and the inner flanks of the guide groove 41 transversely to the longitudinal axis L, measured in the circumferential direction, with the amount W2–G. W1<W2. Thus on retraction, outside the functional portion A when entering the transitional portion B, there is a loose form fit of the guidance so that the friction of the guidance is lower. The resulting lower stiffness of the casing unit 3 is acceptable since the transitional portion B is used only briefly on stowage into the retracted stowage position and on extension into the operating position, wherein no actuation of the steering takes place.

Preferably, in the transitional portion B, the guide protrusion 44 also has a distance from the groove base of the guide groove 41, and in the functional portion A the guide portion 44 has contact with the groove base of the guide groove 41, as shown in FIG. 5. Thus the play between the guide protrusion 44 and the guide groove 41 is determined not only by the contact of the guide protrusion 44 on the groove flanks of the guide groove 41, but also by the contact or play existing between the guide protrusion 44 and the groove base of the guide groove 41.

Figure 8:
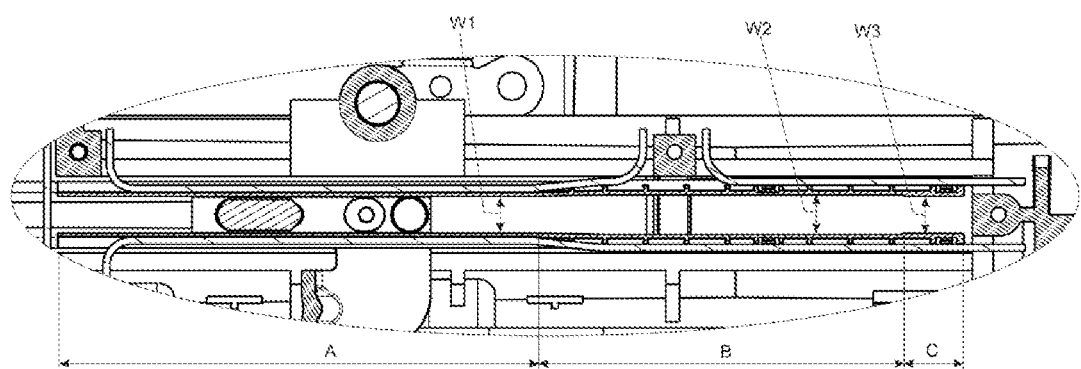
FIG. 8 is an enlarged, detail view of another example guide device.

In the refinement shown in FIG. 8, at the other end region of the adjustment travel opposite the functional portion A, adjoining the transitional portion B is a further functional portion C which corresponds to a retracted stowage position. The total possible adjustment travel thus substantially corresponds to the sum of portions A+B+C. In the stowage range C, the guide groove 41 has a groove width W3 which is smaller than the groove width W2 in the transitional portion B, allowing a low-play guidance and holding in the stowage position. W2>W3. The stiffness in the stowage range C is not as decisive as in the operating range A, so W3 may be greater than W1, and W2>W3>W1. It may also be provided that W1=W3 and W2>W3 and W2>W1.

LIST OF REFERENCE SIGNS

1 Steering column
2 Carrier unit
21 Fixing openings
3 Casing unit
31 Outer casing
32 Inner casing
33 Steering spindle
34 Connecting portion
4 Guide device
41 Guide groove
42 Guide track body
43 Carrier element
44 Guide protrusion
45 Guide element body
5 Adjustment drive
51 Motor
52 Spindle nut
53 Threaded spindle
6 Energy absorption device
61 Profile rail
62 Slot
L Longitudinal axis
G Width of guide protrusion 44
A, C Functional portion
B Transitional portion
W1 Groove width A
W2 Groove width B
W3 Groove width C

What is claimed is:

1. A steering column for a motor vehicle, comprising:
a casing unit in which a steering spindle is mounted so as to be rotatable about a longitudinal axis that extends in a length direction, the casing unit having casings that are adjustably guided relative to one another through a range of adjustment travel in the length direction, wherein part of the range of adjustment travel corresponds to a transitional portion and part of the range of adjustment travel corresponds to a functional portion, wherein the casings are configured to be guided with greater play in the transitional portion than in the functional portion,
wherein a first casing of the casings has a guide track and a second casing of the casings has a guide element that is configured to engage in the guide track, wherein the guide element is configured to be guided in the length direction and is configured to have a guide play in the guide track that is greater in the transitional portion than in the functional portion.

2. The steering column of claim 1 wherein the guide track and the guide element constitute a form-fit connection that is active in a circumferential direction.

3. The steering column of claim 1 wherein the guide play between the guide track and the guide element exists in a circumferential direction.

4. The steering column of claim 1 wherein the guide track has an elongate guide groove in which a guide protrusion of the guide element engages, with some portions of the elongate guide groove having a smaller groove width than another portion.

5. The steering column of claim 1 wherein the guide track has an elongate guide protrusion that is configured to engage in a guide recess of the guide element, with some portions of the elongate guide protrusion having a greater web width than another portion.

6. The steering column of claim 1 wherein the guide play is smaller at a first end portion and/or a second end portion of the guide track.

7. The steering column of claim 1 wherein at least one of:
the guide track includes a guide track body; or
the guide element has a guide element body that is arranged or formed on one of the casings.

8. The steering column of claim 7 wherein at least one of the guide track body or the guide element body are formed separately and connected to one of the casings.

9. The steering column of claim 7 wherein at least one of the guide track body or the guide element body are comprised of different material than that of the casings.

10. The steering column of claim 9 wherein at least one of the guide track body or the guide element body are comprised of plastic.

11. The steering column of claim 1 wherein the casings comprise an upper casing and a lower casing.

12. The steering column of claim 11 comprising an intermediate casing disposed between the upper casing and the lower casing.

13. The steering column of claim 1 wherein the casings comprise telescopic casing tubes.

14. The steering column of claim 1 comprising a motorized adjustment drive that is coupled to the casings to adjust the casings relative to one another.

15. The steering column of claim 1 comprising an energy absorption device disposed between the guide track or the guide element and one of the casings.

* * * * *

UNITED STATES PATENT AND TRADEMARK OFFICE
CERTIFICATE OF CORRECTION

| | |
|---|---|
| PATENT NO. | : 11,904,930 B2 |
| APPLICATION NO. | : 18/007857 |
| DATED | : February 20, 2024 |
| INVENTOR(S) | : Benjamin Deeg and Eric Caron |

It is certified that error appears in the above-identified patent and that said Letters Patent is hereby corrected as shown below:

On the Title Page

Item (73) Assignees should read: thyssenkrupp Presta AG, Eschen (LI); thyssenkrupp AG, Essen (DE)

Signed and Sealed this
Twentieth Day of August, 2024

Katherine Kelly Vidal
*Director of the United States Patent and Trademark Office*